United States Patent
Kim et al.

(10) Patent No.: US 11,892,558 B2
(45) Date of Patent: Feb. 6, 2024

(54) METHOD AND APPARATUS FOR ESTIMATING DIRECTION OF ARRIVAL OF RADAR RECEPTION SIGNAL USING ANTENNA ARRAY EXTRAPOLATION

(71) Applicant: Seoul National University R&DB Foundation, Seoul (KR)

(72) Inventors: Seong-Cheol Kim, Seoul (KR); Seong-Wook Lee, Seoul (KR); Heon-Kyo Sim, Seoul (KR)

(73) Assignee: Seoul National University R&DB Foundation, Seoul (KR)

(*) Notice: Subject to any disclaimer, the term of this patent is extended or adjusted under 35 U.S.C. 154(b) by 594 days.

(21) Appl. No.: 17/053,389

(22) PCT Filed: May 9, 2018

(86) PCT No.: PCT/KR2018/005323
§ 371 (c)(1),
(2) Date: Nov. 6, 2020

(87) PCT Pub. No.: WO2019/216452
PCT Pub. Date: Nov. 14, 2019

(65) Prior Publication Data
US 2021/0080542 A1      Mar. 18, 2021

(30) Foreign Application Priority Data
May 8, 2018   (KR) .................. 10-2018-0052692

(51) Int. Cl.
*G01S 7/35* (2006.01)
*G01S 13/42* (2006.01)
*H01Q 3/40* (2006.01)

(52) U.S. Cl.
CPC .............. *G01S 7/354* (2013.01); *G01S 13/42* (2013.01); *H01Q 3/40* (2013.01); *G01S 7/356* (2021.05)

(58) Field of Classification Search
None
See application file for complete search history.

(56) References Cited

U.S. PATENT DOCUMENTS

| | | | |
|---|---|---|---|
| 2019/0049577 A1* | 2/2019 | Iida | ........................ H01Q 21/08 |
| 2019/0212411 A1* | 7/2019 | Kang | .................. G01S 5/02521 |
| 2020/0355789 A1* | 11/2020 | Kitamura | ............... H01Q 21/08 |

FOREIGN PATENT DOCUMENTS

| JP | 2001-099906 A | 4/2001 |
|---|---|---|
| JP | 2014-227487 A | 12/2014 |

(Continued)

OTHER PUBLICATIONS

Kim et al., "Improved Direction-of-Arrival Estimation Method Using Virtual Array Antenna;" Proceedings of Symposium of the Korean Institute of Communications and Information Science; Jun. 2013; pp. 703-704; 4 Pages.

(Continued)

*Primary Examiner* — Whitney Moore
(74) *Attorney, Agent, or Firm* — DALY, CROWLEY, MOFFORD & DURKEE, LLP

(57) ABSTRACT

A method and an apparatus for estimating direction of arrival of radar reception signal using antenna array extrapolation. Obtained is a transformation matrix representing a relationship between phases of reception signals received through $i^{th}$ to $(N-2+i)^{th}$ antennas and a phase of a reception signal received through $(N-1+i)^{th}$ antenna in a ULA antenna unit including N actual antennas. A phase of a virtual reception signal received through a new $(N+i)^{th}$ virtual antenna is generated by multiplying values corresponding to phases of the reception signals received through $(i+1)^{th}$ to (Continued)

$(N-1+i)^{th}$ antennas by the transformation matrix. A magnitude of the virtual reception signal received through the $(N+i)^{th}$ virtual antenna is obtained by averaging magnitudes of the reception signals received through $i^{th}$ to $(N-1+i)^{th}$ antennas.

15 Claims, 10 Drawing Sheets

(56) References Cited

FOREIGN PATENT DOCUMENTS

| JP | 2016-014608 | A | 1/2016 |
|---|---|---|---|
| JP | 2018-048978 | A | 3/2018 |
| KR | 10-2014-0057887 | A | 5/2014 |
| KR | 10-2016-0088644 | A | 7/2016 |
| KR | 10-2017-0127939 | A | 11/2017 |
| KR | 10-1807499 | B1 | 12/2017 |

OTHER PUBLICATIONS

Sim et al., "Improved Direction of Arrival Estimation Scheme Using Extrapolation in Uniform Linear Array Antenna System;" Proceedings of Symposium of the Korean Institute of Communications and Information Science; Jan. 2018; pp. 1456-1457; 4 Pages.

International Search Report dated Mar. 11, 2019 for International Application No. PCT/KR2018/005323; 4 Pages.

\* cited by examiner

METHOD AND APPARATUS FOR ESTIMATING DIRECTION OF ARRIVAL OF RADAR RECEPTION SIGNAL USING ANTENNA ARRAY EXTRAPOLATION

CROSS-REFERENCE TO RELATED APPLICATION

This application is a U.S. National Stage Application of International Application No. PCT/KR2018/005323 filed on May 9, 2018 which is based upon and claims the benefit of priority to Korean Patent Application No. 10-2018-0052692 filed on May 8, 2018 in the Korean Intellectual Property Office. The disclosures of the above-listed applications are hereby incorporated by reference herein in their entirety.

BACKGROUND

1. Technical Field

The present disclosure relates to a technique for estimating a direction of arrival (DOA) of a radar reception signal, and more specifically to a method for improving the arrival direction estimation performance of the radar reception signal using extrapolation based on a uniform linear array (ULA) antenna unit, and an apparatus therefor.

2. Description of the Related Art

One of the most important issues in autonomous vehicle systems is human safety. To prevent unexpected car accidents, many sensors such as cameras, radio detection and ranging, so called radar sensors and light detection and ranging, so called LiDAR sensors are used in autonomous vehicles. Among various target detection sensors, the radar sensor that can be used in bad weather is being widely studied.

For example, let's consider a case in which two vehicles in front of a radar system are adjacent to each other and are apart from the radar system by approximately the same distance. The radar system must be able to recognize that there are two vehicles in front, not one. When the speeds and ranges-to-radar system of a plurality of targets are similar, it is important to accurately estimate the DOA of the target to distinguish the targets from each other.

Until now, many techniques have been developed to achieve the maximum DOA estimation performance using the minimum antenna and minimum antenna spacing. Angle estimation algorithms include high resolution DOA estimation algorithms such as a multiple signal classification (MUSIC) algorithm, and estimation of signal parameters via rotational invariance technique (ESPRIT) algorithm. In recent years, the Bartlett algorithm, which is less affected by a signal-to-noise ratio (SNR) than the MUSIC algorithm, has attracted attention and has been widely used. The MUSIC algorithm requires a lot of computation, needs to know the number of targets in advance, and is greatly affected by the SNR. The Bartlett algorithm, which has fewer such disadvantages, is widely used as a vehicle DOA estimation algorithm. However, when two or more targets are adjacent to each other, they cannot be distinguished from each other by using the existing DOA estimation algorithms such as the Bartlett algorithm, the MUSIC algorithm, etc.

It is recommended to increase the number of antennas in order to increase the resolution when measuring the arrival direction of the reception signal of the radar. However, there is a problem that as the number of actual physical antennas is increased, the space occupied by them increases. Instead of increasing the number of actual antennas, a virtual antenna using the actual antennas can be created to increase the total number of antennas. Existing methods have limitations because the number of virtual antennas that can be increased is affected by the actual number of antennas. In addition, since DOA estimation performance is not significantly improved, an antenna array having a large aperture size should be used. Accordingly, there is a problem that a grating lobe occurs.

SUMMARY

The present disclosure is to provide a method of estimating the DOA of a radar reception signal for improving resolution of adjacent targets by using antenna array extrapolation for the ULA antenna unit.

The present disclosure is to provide a method of estimating the DOA which can improve the DOA resolution of the radar reception signal by using a small number of antennas and a small antenna aperture size in the ULA antenna unit to prevent the generation of grating lobes within a field of view (FOV) range.

In addition, the present disclosure is to provide an apparatus for performing the method of estimating the DOA.

The method of estimating a DOA of a radar reception signal using antenna array extrapolation according to embodiments of the present disclosure includes: obtaining a transformation matrix which represents a relationship between phases of reception signals received through $i^{th}$ to $(N-2+i)^{th}$ antennas and a phase of a reception signal received through $(N-1+i)^{th}$ antenna in a ULA antenna unit in which N actual antennas are arranged in a row and spaced by an equal interval d, where i is a natural number greater than 1; generating a phase of a virtual reception signal received through a new $(N+i)^{th}$ virtual antenna by multiplying values corresponding to phases of the reception signals received through $(i+1)^{th}$ to $(N-1+i)^{th}$ antennas by the obtained transformation matrix; and obtaining a magnitude component of the virtual reception signal received through the $(N+i)^{th}$ virtual antenna by averaging magnitudes of the reception signals received through $i^{th}$ to $(N-1+i)^{th}$ antennas. In addition, the method of estimating the DOA of the radar reception signal further includes performing recursively, while increasing the number i of the virtual antennas by one, the steps of obtaining the transformation matrix, generating the phase of the virtual reception signal, and obtaining the magnitude component of the virtual reception signal until the number i becomes equal to a predetermined threshold value M.

In an embodiment of the method of estimating the DOA of the radar reception signal, the threshold value M may be determined in a range of 1 to 3N in consideration of at least a signal-to-noise ratio and the intervals of the antennas.

In an embodiment of the method of estimating the DOA of the radar reception signal, the method may further include calculating the DOA by performing a predetermined DOA estimation algorithm using virtual reception signals of which number is a predetermined number M and reception signals directly received through the N actual antennas.

In an embodiment of the method of estimating the DOA of the radar reception signal, the predetermined DOA estimation algorithm may be a Bartlett algorithm.

In an embodiment of the method of estimating the DOA of the radar reception signal, the interval d of the antennas may not be greater than a wavelength $\lambda$ of the reception signal.

In an embodiment of the method of estimating the DOA of the radar reception signal, the transformation matrix may be obtained using a linear least square (LLS) method based on a relationship between the reception signals.

In an embodiment of the method of estimating the DOA of the radar reception signal, the method may further include: receiving, through N actual antennas, radio signals in time domain reflected from a target in front; transforming the received radio signals in time domain into signals in frequency domain; and transforming a signal corresponding to a beat frequency among the transformed signals in frequency domain into a signal in time domain. Also, the signal used to obtain the transformation matrix may be a signal in time domain corresponding to a signal of the beat frequency.

In an embodiment of the method of estimating the DOA of the radar reception signal, the step of 'transforming the received radio signals in time domain into signals in frequency domain' may include transforming each of the received radio signals in time domain into a complex signal form using a Hilbert transform; transforming the complex signal into a frequency domain signal by performing Fourier transform; and calibrating the transformed signal in frequency domain.

In an embodiment of the method of estimating the DOA of the radar reception signal, the step of 'transforming a signal corresponding to a beat frequency among the transformed signals in frequency domain into a signal in time domain' may include: extracting a signal corresponding to the beat frequency from among the transformed signal in frequency domain; and transforming the extracted signal corresponding to the beat frequency into a signal in time domain by inverse Fourier transform.

Meanwhile, an apparatus for estimating a DOA of a radar reception signal using antenna array extrapolation according to embodiments of the present disclosure includes a ULA antenna unit, a passband unit, and a data processing unit. The ULA antenna unit includes N actual antennas for receiving a radar signal reflected ad returned after transmitting the radar signal forward, and the N actual antennas are arranged in a row and spaced by an equal interval d. The passband unit extracts an intermediate frequency signal of the radar reception signal received through the ULA antenna unit and converts the extracted intermediate frequency signal into a digital signal. The data processing unit includes functions of: obtaining a transformation matrix which represents a relationship between phases of reception signals received through $i^{th}$ to $(N-2+i)^{th}$ antennas and a phase of reception signal received through $(N-1+i)^{th}$ antenna, by using the reception signal in digital form provided from the passband unit, where i is a natural number greater than 1; generating a phase of a virtual reception signal received through a new $(N+i)^{th}$ virtual antenna by multiplying values corresponding to phases of the reception signals received through $(i+1)^{th}$ to $(N-1+i)^{th}$ antennas by the obtained transformation matrix; obtaining a magnitude component of the virtual reception signal received through the $(N+i)^{th}$ virtual antenna by averaging magnitudes of the reception signals received through $i^{th}$ to $(N-1+i)^{th}$ antennas; and performing recursively, while increasing the number i of the virtual antennas by one, the 'obtaining the transformation matrix', the 'generating the phase of the virtual reception signal', and the 'obtaining the magnitude component of the virtual reception signal' until the number i becomes equal to a predetermined threshold value M.

In an embodiment of the apparatus for estimating the DOA of the radar reception signal, the threshold value M may be determined in a range of 1 to 3N in consideration of at least a signal-to-noise ratio (SNR) and a spacing of the antennas.

In an embodiment of the apparatus for estimating the DOA of the radar reception signal, the data processing unit may further include a function of calculating the DOA by performing a predetermined DOA estimation algorithm using virtual reception signals of which number is the threshold value M and reception signals directly received through the N actual antennas.

In an embodiment of the apparatus for estimating the DOA of the radar reception signal, the transformation matrix may be obtained using a linear least square (LLS) method based on a relationship between the reception signals.

In an embodiment of the apparatus for estimating the DOA of the radar reception signal, the interval d of the N actual antennas may not be greater than a wavelength λ of the reception signal.

The present disclosure creates the virtual antenna using extrapolation based on a relationship between actual reception signals reflected and returned from a target. According to the present disclosure, it is possible to increase the number of virtually created antennas in the log-domain by using linear prediction antenna array extrapolation. By using a large number of virtual antennas together with actual antennas, the main lobe of the generated beam can be made sharply. Since a sharp main lobe can be made, the ability to distinguish a plurality of targets close to each other can be greatly improved. The method according to the present disclosure can achieve the same effect as using many antennas even when a small number of actual antennas are used. According to the present disclosure, unlike the conventional extrapolation method, the number of virtual antennas can be increased to at least three times or more of the number of actual physical antennas. According to the present disclosure, the number of virtual antennas can be increased by using linear prediction extension, and accordingly, the degree of resolution is further increased.

According to the present disclosure, a small antenna aperture size can be used. Accordingly, it is possible to prevent the grating lobe from being generated within the field of view (FOV) range. Because of this, the present disclosure enables a considerably high resolution even when the antenna aperture size is small. In other words, when an antenna having the same size is used, the present disclosure can provide better DOA estimation performance compared to the prior art. Furthermore, the space occupied by the antennas can be greatly reduced, and as it becomes possible to use fewer antennas, the cost of configuring the system can be greatly reduced. Since the grating lobe does not occur, there is no case that the grating lobe is misjudged as an actual target. In other words, it has a narrow beam width, a low side lobe, and a low grating lobe at the same time in a limited antenna aperture size, so that high resolution can be realized.

The present disclosure can be applied to radar for the autonomous vehicles. Due to the improved resolution, it is possible to recognize multiple vehicles in front that are close to each other as accurately as the actual number of vehicles without being mistaken as one. As a result, it is possible to accurately monitor the front and effectively prevent vehicle collisions and the like.

DETAILED DESCRIPTION OF THE EMBODIMENTS

Hereinafter, exemplary embodiments of the present disclosure will be described in detail with reference to the accompanying drawings.

Figure 1:
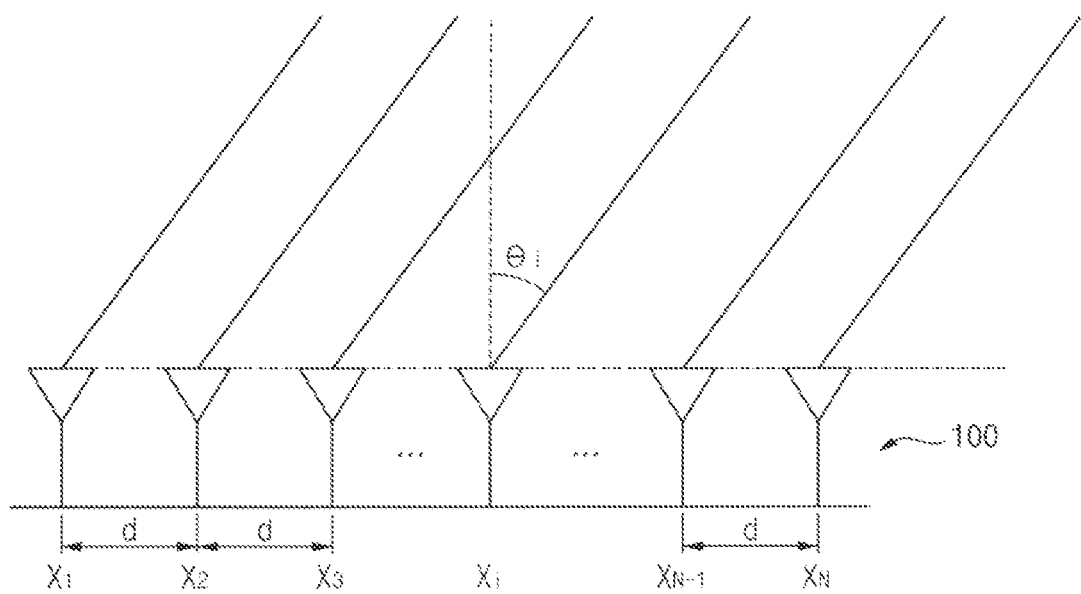
FIG. 1 shows that a ULA antenna unit in which N antennas are arranged in the ULA type receives radio signals.

FIG. 1 shows that a ULA antenna unit 100 in which N identical antennas are arranged in a row and spaced by a substantially equal interval d receives radio signals reflected and returned from one or more targets in front of itself according to an example embodiment. In this ULA antenna unit 100, the reception signals may be expressed as follows.

$$x(t) = As(t) + n(t) \tag{1}$$

Here, $x(t) = [x_1(t), x_2(t), \ldots, x_N(t)]^T$ is a reception signal vector, and $[\bullet]^T$ is a transposition operator. In addition, N represents the number of antennas, and t represents the $t^{th}$ time sample. $A = [a(\theta_1), a(\theta_2), \ldots, a(\theta_L)]$ is a steering matrix. L is the number of the targets. The steering matrix is composed of the steering vector $a(\theta_i)$ given as follows.

$$a(\theta_i) = \left[ e^{j\frac{2\pi}{\lambda}d_1 \sin\theta_i}, e^{j\frac{2\pi}{\lambda}d_2 \sin\theta_i}, \ldots, e^{j\frac{2\pi}{\lambda}d_N \sin\theta_i} \right]^T \tag{2}$$

Here, i is 1, 2, ..., and L. $\lambda$ is a wavelength of a reception signal of an antenna, and $d_i$ is a distance from the first antenna to the $i^{th}$ antenna. $\theta_i$ denotes a DOA of the $i^{th}$ target (that is, an angle between a straight line perpendicular to an extension line of the ULA antenna unit 100 and a vector of a signal incident on each antenna). In the example embodiment of the present disclosure, $d_1 = 0$, $d_2 = d$, $d_N = (N-1)d$ because the ULA antenna unit 100 is used, where d is the antenna interval. $s(t) = [s_1(t), s_2(t), s_L(t)]^T$ denotes a vector of Lx1 incident signals at time t. $n(t) = [n_1(t), n_2(t), \ldots, n_N(t)]^T$ denotes a zero mean white Gaussian noise vector of Nx1 at time t.

An autocorrelation matrix of the reception signals received by the ULA antenna unit 100 may be estimated as follows.

$$R_{xx} = E[x(t) \cdot x^H(t)] \tag{3}$$

Here, $E[\bullet]$ is the expected value (expectation), $R_{xx}$ is the correlation matrix of the reception signals x(t), and $(\bullet)^H$ is the conjugate transpose operation. If the signal processing is ergodic, that is, under a condition in which a system returns to a state that is almost similar to the original state after a considerable period of time, an ensemble average may be expressed as a time average. Therefore, using the time average, the autocorrelation matrix $\hat{R}_{xx}$ may be calculated as follows.

$$R_{xx} = \frac{1}{K} \sum x(t) \cdot x^H(t) \tag{4}$$

Here, K is the number of time samples.

Meanwhile, the goal of the Bartlett Algorithm is to determine a weight vector. The weight vector is to maximize the power of the reception signals while keeping their noise levels constant. An array output may be expressed as a value obtained by multiplying the reception signals by the weight vector w.

$$y(t) = w^H x(t) \tag{5}$$

Here, w is the weight vector of Nx1, and y(t) is a weighted output of the reception signals. When the reception signals are incident on the ULA antenna unit 100 along the angle $\theta$ direction, the weight vector may be expressed as follows.

$$\begin{aligned}
w^* &= \underset{w}{\operatorname{argmax}} P(\theta) \\
&= \underset{w}{\operatorname{argmax}} E[|y(k)|^2] = \underset{w}{\operatorname{argmax}} E[|w^H x(k)|^2] \\
&= \underset{w}{\operatorname{argmax}} w^H E[a(\theta)s(k)s^H(k)a^H(\theta) + 2a(\theta)s(k)n^H(k) + n(k)n^H(k)]w \\
&= \underset{w}{\operatorname{argmax}} w^H E[a(\theta)s(k)s^H(k)a^H(\theta) + n(k)n^H(k)]w \\
&= \underset{w}{\operatorname{argmax}} \{ E[|s(k)|^2] |w^H a(\theta)|^2 + \sigma_n^2 |w|^2 \}
\end{aligned} \tag{6}$$

Here, $P(\theta)$ represents the output power spectrum of the Bartlett algorithm. $E[n(k)n^H(k)] = \sigma_n^2 I$ and $\sigma_n^2$ denotes the noise variance. Since the signal component and the noise component are not correlated, $E[a(\theta)s(k)n^H(k)]$ can be omitted from the above equation. To keep the size of the noise component constant, it can be set that $|w| = 1$. Therefore, a solution of Equation (6) is as follows.

$$w^* = \frac{a(\theta)}{\sqrt{a^H(\theta)a(\theta)}} \tag{7}$$

The output power spectrum of the Bartlett algorithm can be expressed as follows.

$$P(\theta) = \frac{a^H(\theta) R_{xx} a(\theta)}{a^H(\theta) a(\theta)} \tag{8}$$

Since P(θ) is the maximum value at the angle at which the target is located, a DOA of the target can be estimated.

Figure 2:
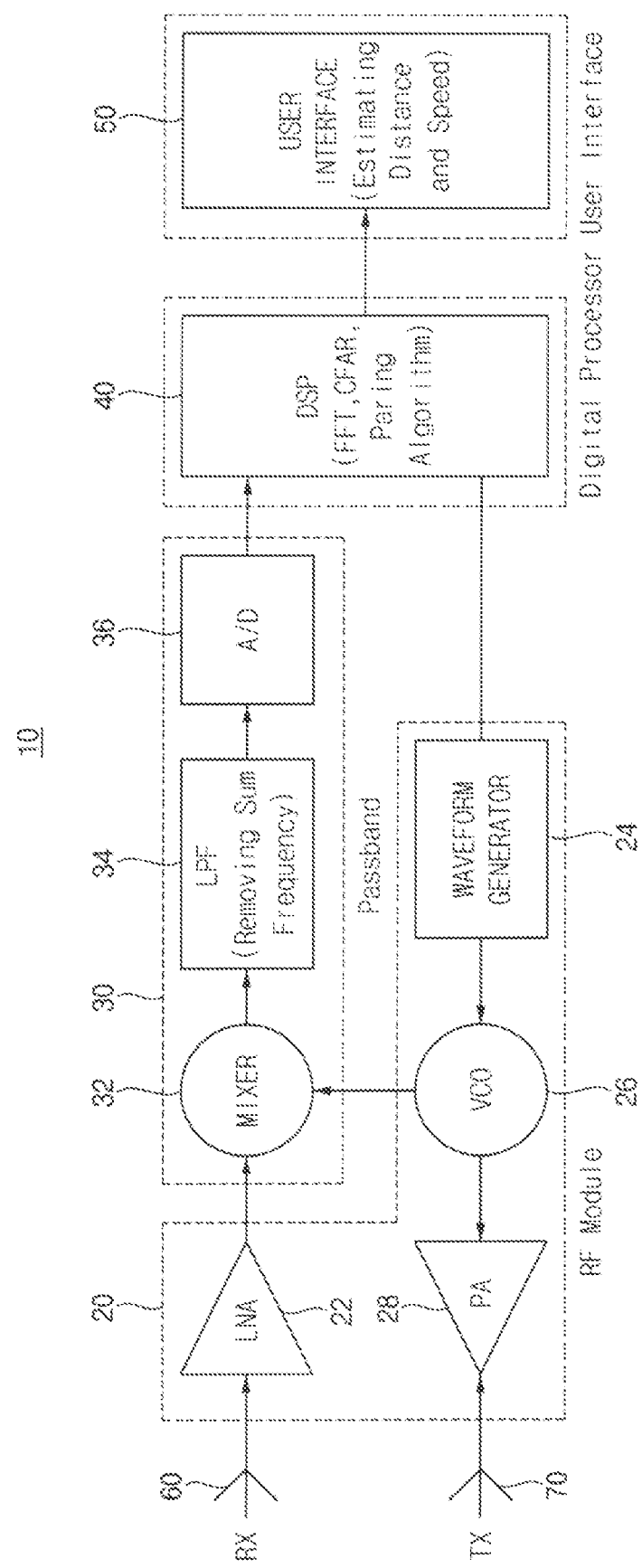
FIG. 2 illustrates a configuration of a system for performing the method according to an embodiment of the present disclosure.

FIG. 2 shows an exemplary configuration of a ULA antenna unit based radar system 10 for performing the method according to the example embodiment of the present disclosure.

Referring to FIG. 2, the radar system 10 may include a radio frequency (RF) communication module 20 connected to a ULA receiving antenna unit 60 and a ULA transmitting antenna unit 70, a passband unit 30, and a data processing unit 40. The data processing unit 40 may be implemented by means of, for example, a digital signal processor (DSP) or a data processing device such as a microprocessor, a microcomputer, a CPU, etc. Hereinafter, it is assumed that the data processing unit 40 is composed of the DSP unit 40. In addition, the radar system 10 may further include a user interface (UI) unit 50 connected to the DSP unit 40.

Each of the ULA receiving antenna unit 60 and the ULA transmitting antenna unit 70 may include a plurality of antennas. In particular, the ULA receiving antenna unit 60 may have a ULA type antenna array in which a plurality of antennas is arranged in a line at equal intervals. The ULA receiving antenna unit 60 may receive the radio frequency radar signals reflected by targets in front and returned after being transmitted from the ULA transmitting antenna unit 70.

According to an example embodiment, the RF communication module 20 may include a low-noise amplifier (LNA) 22, a waveform generator 24, an oscillator 26, and a power amplifier (PA) 28.

The LNA 22 may be connected to the ULA receiving antenna unit 60 to amplify a weak signal captured by the ULA receiving antenna unit 60. The waveform generator 24 may generate a signal having a predetermined analog waveform based on a digital output signal provided by the DSP unit 40. The oscillator 26 may convert the signal generated by the waveform generator 24 into a radio frequency (RF) signal in order to wirelessly transmit the signal. The oscillator 26 may be composed of, for example, a voltage controlled oscillator (VCO). The PA 28 may amplify a signal output from the oscillator 26 to an output required for transmission and provide the amplified signal to the ULA transmitting antenna unit 70.

The pass band unit 30 may include a frequency mixer 32, a low-pass filter (LPF) 34, and an analog-to-digital converter (ADC) 36.

The frequency mixer 32 may mix the reception signal output from the LNA 22 and the oscillation signal output from the oscillator 26. The output signal of the frequency mixer 32 may have a frequency component obtained by mixing the frequency components of the two input signals. The LPF 34 may extract an intermediate frequency (IF) signal from the output signal of the frequency mixer 32 by removing the sum frequency of the reception signal and the oscillation signal included in the output signal of the frequency mixer 32. The A/D converter 36 may convert the IF signal obtained through the LPF 34 into a digital signal. The digital signal converted in this way may be provided to the DSP unit 40.

The DSP unit 40 may estimate the DOA by processing the digital IF signal provided from the passband unit 30 according to a method described below. In addition, the DSP unit 40 may generate a signal to be transmitted to the front for target detection and provide to the RF module 20.

The UI unit 50 may display a processing result of the DSP unit 40 so that a user can know it or may transmit a user's instruction to the DSP unit 40.

In the example embodiment of the present disclosure, the algorithm for the method of estimating the DOA of a reception signal may be implemented as a computer program. The program may be stored in a computer-readable recording medium or data storage means such as a memory inside the DSP unit 40. Further, the DSP unit 40 can load and execute the computer program stored in the data storage means.

Figure 3:
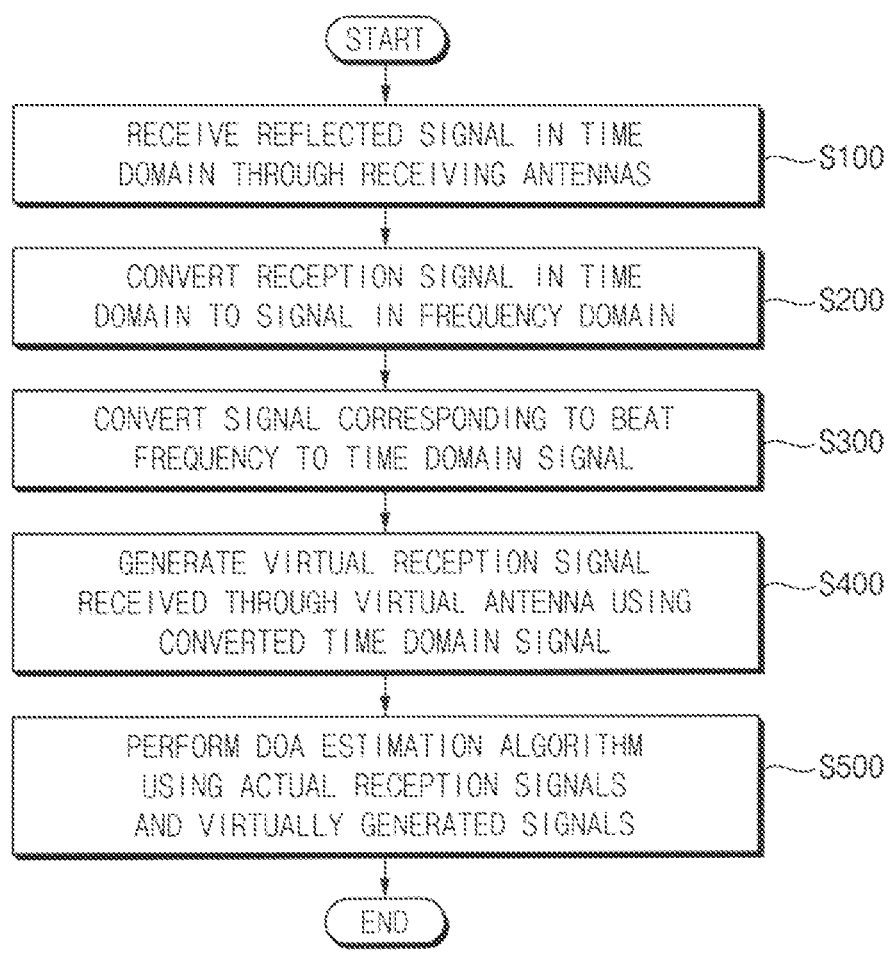
FIG. 3 is a flowchart illustrating a procedure for estimating the DOA of a reception signal based on the method according to an embodiment of the present disclosure.
Figure 7:
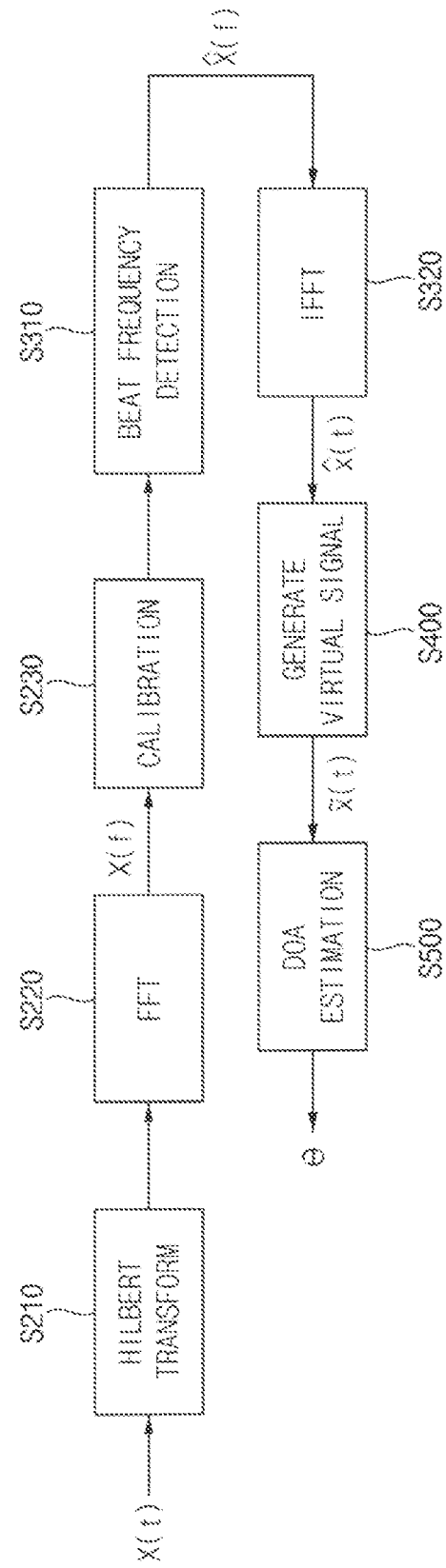
FIG. 7 shows an operation process for estimating DOA of a reception signal based on the method according to an embodiment of the present disclosure in the DSP of the system shown in FIG. 2.

FIG. 3 is a flowchart illustrating the method of estimating DOA of a reception signal according to an example embodiment of the present disclosure. FIG. 7 shows an operation process for DOA estimation according to an example embodiment of the present disclosure in the DSP unit 40 of the radar system 10 shown in FIG. 2. The DOA estimation method described below may be implemented as a computer program and embedded in the DSP unit 40.

Referring to FIG. 2 together with FIGS. 3 and 7, in the radar system 10, the RF module 20 may generate a RF signal based on a digital signal provided by the DSP unit 40 and transmits the RF signal through the ULA transmitting antenna unit 70. The transmitted RF signal may hit targets in front and be reflected. The reflected RF signal may be received through the ULA receiving antenna unit 60 (step S100).

Figure 4:
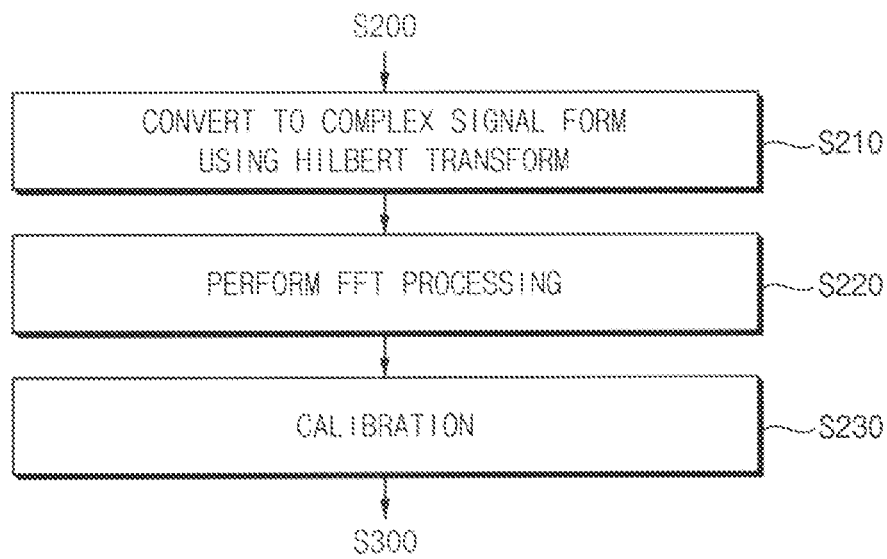
FIG. 4 shows a detailed execution procedure of step S200 of the flowchart shown in FIG. 3.

The reception signal received by the ULA receiving antenna unit 60 is a signal in the time domain. This may be converted into a signal in the frequency domain (step S200). The flowchart of FIG. 4 shows a detailed execution procedure of step S200 of the flowchart shown in FIG. 3. Referring to this, a signal in the time domain provided by the passband unit 30 may be converted into a complex signal form in the DSP unit 40 by using a Hilbert Transform algorithm (step S210). The converted complex signal may be transformed into a frequency domain signal (step S220). This transformation may be performed, for example, using a Fast Fourier Transform (FFT) algorithm. A calibration process may be performed on the transformed frequency domain signal (S230).

Figure 5:
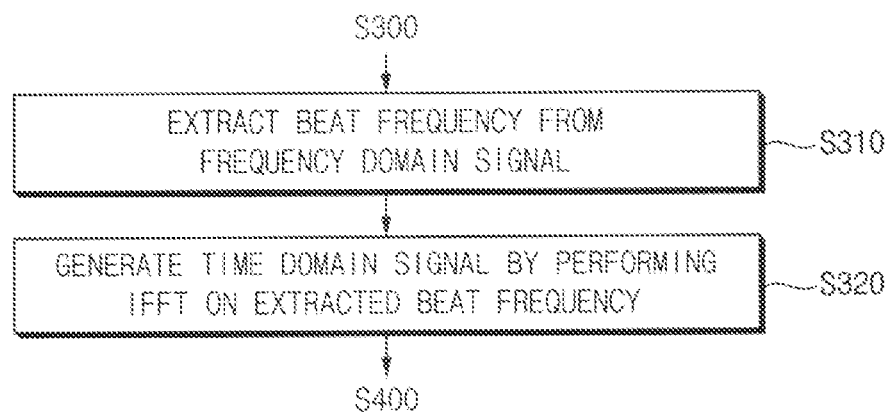
FIG. 5 shows a detailed execution procedure of step S300 of the flowchart shown in FIG. 3.

Among the frequency domain signals transformed, a signal corresponding to a beat frequency may be transformed back to a signal in the time domain (step S300). The flowchart of FIG. 5 shows a detailed execution procedure of step S300. Referring to this, the beat frequency signal may be extracted from the frequency domain signal obtained through the FFT (step S310). The extracted beat frequency signal may be transformed into a time domain signal by performing inverse fast Fourier transform (IFFT) (step S320).

When the time domain signal is obtained through such transformation, a virtual reception signal received through a virtual antenna may be generated using the transformed time domain signal (step S400).

After obtaining virtual reception signals received through a desired number of virtual antennas, the algorithm for DOA estimation may be performed by using the virtual reception signal and signals received through the actual physical antennas together (step S500).

Figure 6:
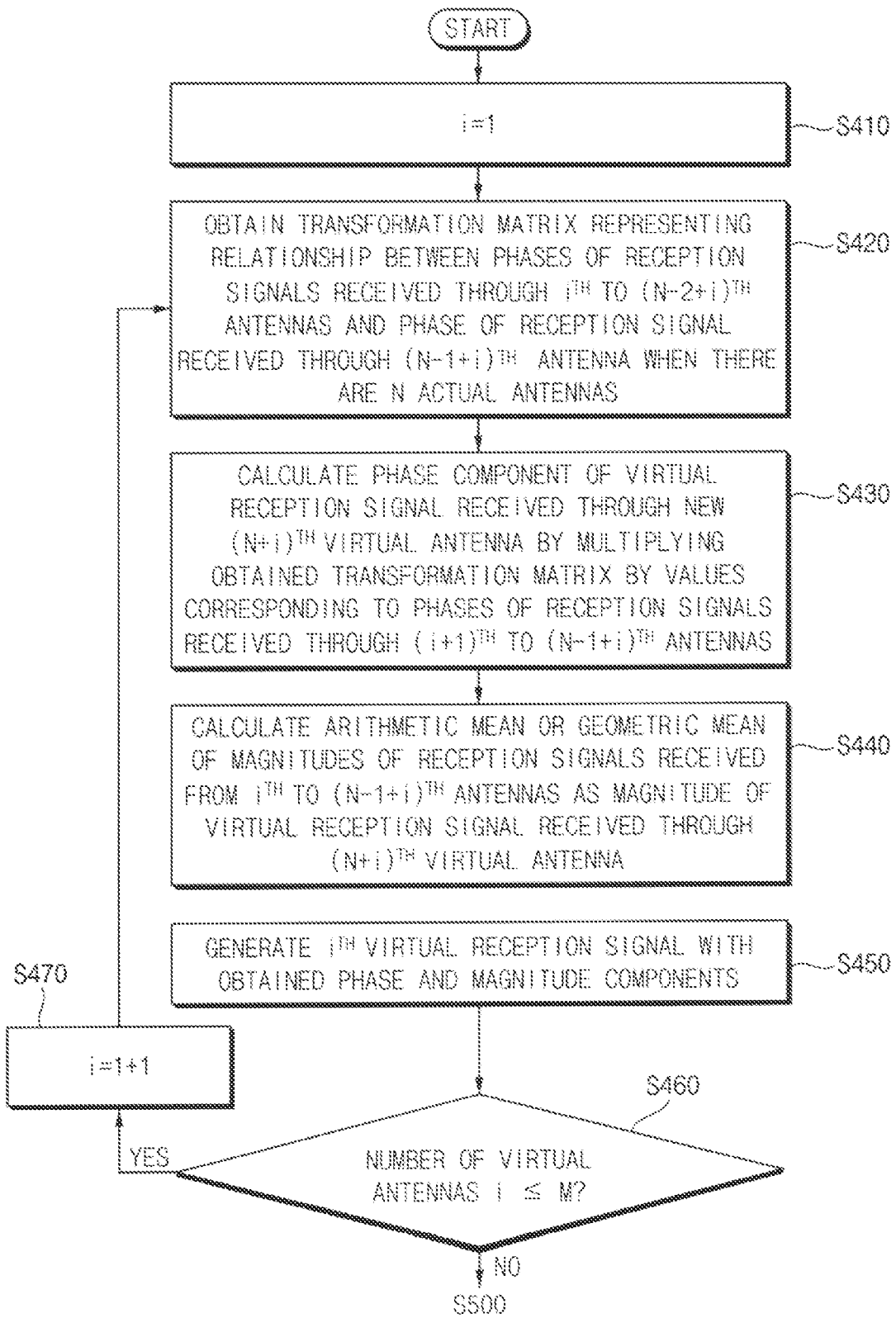
FIG. 6 shows a detailed execution procedure of step S400 of the flowchart shown in FIG. 3.
Figure 8:
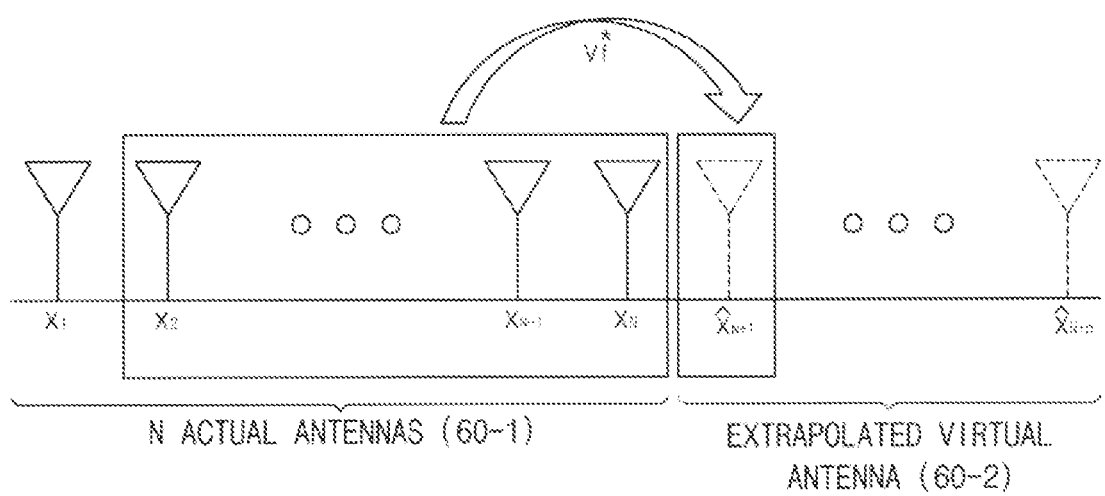
FIG. 8 conceptually shows a method of increasing the number of virtual antenna reception signals using virtual antennas according to an embodiment of the present disclosure.

FIG. 6 is a more detailed flowchart illustrating an execution procedure of step S400 of generating a virtual reception signal according to an example embodiment of the present disclosure. FIG. 8 conceptually shows a method of the present disclosure for generating reception signals of the virtual antennas while increasing the virtual antennas by extrapolation using the reception signals of the N actual antennas when the ULA receiving antenna unit 60 is composed of N real antennas arranged in the ULA form. A process (step S400) for generating the virtual reception signal will be described in more detail with further reference to these drawings.

It is assumed that the number of actual antennas constituting the ULA receiving antenna unit 60 is N. When there are N antennas in the ULA, the reception signal of the $(N+1)^{th}$ antenna separated by Nd from the first antenna may be predicted using the relationship between the reception signal $x_N(t)$ of the $N^{th}$ antenna and the reception signals $x_1(t), x_2(t), \ldots, x_{N-1}(t)$ of other antennas.

Initially, the number of virtual antennas, that is, the number i of reception signals received through the virtual antennas is set to 1 (step S410).

Then, a step (S420) of obtaining a transformation matrix to be used to generate a virtual reception signal may be performed. In this step (S420), the transformation matrix can be obtained, where the transformation matrix represents the relationship between phases of the reception signals received through (N−1) antennas from $i^{th}$ to $(N-2+i)^{th}$ antennas and a phase of the reception signal received through the $(N-1-i)^{th}$ antenna. That is, the transformation matrix may be a matrix that makes the 'phase' of the reception signal received through the $(N-1+i)^{th}$ antenna by multiplying the 'phases' of the reception signals received through the $i^{th}$ to $(N-2+i)^{th}$ antennas by the weight vector. Here, the transformation matrix to be obtained is characterized in that it is not a transformation matrix for both the phase and magnitude of the reception signal, but a transformation matrix limited only to the phase. Let's assume that N reception signals are incident on the ULA receiving antenna unit 60 with a constant phase difference. In this case, if both the phase and magnitude components of the entire reception signals are used to obtain a virtual reception signal, deformation in the phase components may occur in the process of matching the magnitude components. However, if only the relationship between the phase components excluding the magnitude components of the reception signals is used for calculating the transformation matrix, the deformation of the phase components can be minimized.

A reception signal $x_i$ received through the $i^{th}$ antenna among the N antennas arranged in the ULA form can be expressed as follows.

$$x_i = a_i e^{j\Phi_i} \tag{9}$$

Here, $a_i$ is a norm vector of the $i^{th}$ reception signal $x_i$, and $\Phi_i$ is a phase component of the $i^{th}$ reception signal $x_i$.

For example, when i=1, the transformation matrix may represent a linear relationship between the phases $\Phi_1, \Phi_2, \ldots, \Phi_{N-1}$ of the reception signals received through the first to the $(N-1)^{th}$ antennas and the phase $\Phi_N$ of the reception signal through the last $N^{th}$ antenna. Using the linear relationship, it is possible to predict a virtual reception signal received through the $(N+1)^{th}$ virtual antenna which is away from the first antenna by dN in a first direction (e.g., right).

The phase $\Phi_N$ of the reception signal received through the last $N^{th}$ antenna may be expressed as follows using the phases $\Phi_1, \Phi_2, \ldots, \Phi_{N-1}$ of the reception signals received through the $1^{st}$ to $(N-1)^{th}$ antennas and the transformation matrix $v_f$ to be obtained.

$$\varphi_N = v_f [\Phi_1, \Phi_2, \ldots, \Phi_{N-1}]^T \tag{10}$$

Here, $\Phi_N = [\Phi_N(1), \Phi_N(2) \ldots, \Phi_N(K)]$ and $v_f$ is the $(N-1) \times 1$ transformation matrix in vector form.

Using the phases of the $1^{st}$ to $(N-1)^{th}$ reception signals and the phase of the $N^{th}$ reception signal, the transformation vector $v^*_f$ may be obtained as shown in the following equation. $v^*_f \cdot \Phi_r$ is as close as possible to the phase $\varphi_N$ of the $N^{th}$ reception signal.

$$v^*_f = \operatorname*{argmin}_{v_f} \|\phi_N - v_f \cdot \Phi_r\| \tag{11}$$

Here, $\Phi_r = [\Phi_1, \Phi_2, \ldots, \Phi_{N-1}]^T$. From equation (11), we can obtain a transformation matrix $v^*_f$ that minimizes a norm of the difference between $\varphi_N$ and $v_f \Phi_r$. The transformation matrix may be obtained using the linear least square (LLS) method. Using the LLS method, the transformation matrix $v^*_f$ can be given as follows.

$$v^*_f = \varphi_N \cdot \Phi_r^H \cdot (\Phi_r \cdot \Phi_r^H)^{-1} \tag{12}$$

Once the transformation matrix $v^*_f$ is calculated, it can be used repeatedly to generate extrapolated signals within the same radar scan, so it is very efficient in terms of computational complexity compared to conventional extrapolation methods.

Next, a phase component of a virtual reception signal received through a new virtual antenna may be obtained using the transformation matrix obtained in step S420 (step S430). In other words, it is possible to obtain the phase $\varphi_{N+1}$ of one virtual reception signal received by a new virtual antenna corresponding to the $(N+i)^{th}$ antenna by multiplying the obtained transformation matrix by the values corresponding to the phases of the reception signals received from the $(i+1)^{th}$ to $(N-1+i)^{th}$ antennas.

FIG. 8 conceptually illustrates a method for linear prediction extrapolation of a log-domain based virtual antenna according to an example embodiment of the present disclosure. Referring to FIG. 8, a virtual antenna 60-2 may be generated in a form of extrapolation to the N actual antennas 60-1, and a phase of a virtual reception signal received through the virtual antenna 60-2 may be obtained.

In general, when i=p, that is, assuming that there is a $(N+p)^{th}$ virtual antenna, a phase of a virtual reception signal received through the $(N+p)^{th}$ virtual antenna may be predicted as in Equation (13) below. The value of $\hat{\Phi}_{N+p}$ obtained using Equation (13) is an estimated phase of the extrapolated signal generated through the $(N+p)^{th}$ antenna position of the ULA receiving antenna unit 60.

$$\hat{\phi}_{N+p} = v^*_f \cdot \Psi_{v,p} \tag{13}$$

Here, $$\Psi_{v,p} = \begin{cases} [\phi_2, \phi_3, \ldots, \phi_N] & \text{for } p = 1 \\ [\phi_3, \phi_4, \ldots, \phi_N, \hat{\phi}_{N+1}] & \text{for } p = 2 \\ [\phi_{p+1}, \ldots, \phi_N, \hat{\phi}_{N+1}, \ldots, \hat{\phi}_{N+p-1}] & \text{for } 3 \leq p < N-1 \\ [\phi_N, \hat{\phi}_{N+1}, \ldots, \hat{\phi}_{N+p-1}] & \text{for } p = N-1 \\ [\hat{\phi}_{p+1}, \hat{\phi}_{p+2}, \ldots, \hat{\phi}_{N+p-1}] & \text{for } p \geq N, \end{cases} \tag{14}$$

By using the transformation matrix extraction method described above, the phases from the phase $\Phi_{N+1}$ of the virtual reception signal $\hat{x}_{N+1}$ received through the $(N+1)^{th}$ virtual antenna to the phase $\hat{\Phi}_{N+p}$ of the virtual reception signal $\hat{x}_{N+p}$ received through the $(N+p)^{th}$ virtual antenna 60-2 may be created in turn.

Apart from obtaining the phase of the virtual reception signal, a magnitude component of the virtual reception signal may be also obtained (step S440). That is, an arithmetic mean value or a geometric mean value of the magnitude components of the reception signals received from the $i^{th}$ to $(N-1+i)^{th}$ antennas may be calculated. And the calculated arithmetic mean value or geometric mean value may be obtained as a magnitude component of the virtual reception signal received through the $(N+i)^{th}$ antenna. The magnitude component $a_{N+1}$ of the virtual $(N+i)^{th}$ reception signal may be obtained, for example, using the following equation.

$$a_{N+1} = \sqrt[N]{\prod_{i=1}^{N} a_i} \quad (15)$$

The virtual reception signal received through the $(N+i)^{th}$ antenna (or the $i^{th}$ virtual antenna) may be generated as a signal having a phase component and a magnitude component obtained through the above process (step S450).

In this way, after generating the virtual reception signal when i=1, the number i of generated virtual antennas or the number of virtual reception signals may be compared with a predetermined threshold value M (step S460).

If the number i of the generated virtual reception signals is smaller than the predetermined value M, the number i of the virtual reception signals may be increased by 1 (step S470). That is, 1=2. Then, by returning to the step of obtaining the transformation matrix (step S420), steps S420, S4430, S440, and S450 may be performed. That is, a transformation matrix to which the number (i=2) of changed virtual reception signals is applied may be obtained, and a phase component of the $(N+2)^{th}$ reception signal may be obtained by using the obtained transformation matrix (step S430). In addition, the magnitude component of the $(N+2)^{th}$ reception signal may be also obtained (step S440), and a $(N+2)^{th}$ reception signal may be generated.

These steps S470, S420, S430, S440, and S450 may be repeatedly performed until the number i of virtual reception signals is equal to the predetermined value M. When the number i of the virtual reception signals is equal to the predetermined threshold value M, it may return to step S500 of performing the DOA estimation algorithm using the actual reception signals received through the actual antennas 60-1 and the virtual reception signals received through the virtual antennas 60-2 obtained in step S400.

According to the present disclosure, since the transformation matrix can be obtained directly by using the relationship between the reception signals, it is possible to generate a greater number of virtual antennas than the conventional method. The maximum number of virtual antennas (or virtual reception signals received through them), that is, the predetermined threshold value M may be determined as the maximum number of virtual antennas capable of improving the performance of DOA resolution. The threshold value M may be determined as a value up to the extent that the DOA resolution can be improved in consideration of the SNR in an actual use environment and the interval d of the antennas constituting the ULA receiving antenna unit 60.

The performance of estimating the position of the target may change as the number of antennas generated by the extrapolation method increases. The performance can be analyzed using the root-mean-square error (RMSE). Since the two targets cannot be separated, the resolution is not good at first and the RMSE is high. However, as the number of antennas generated by the linearly predicted expansion increases, the RMSE gradually decreases, and it can be seen that saturation is observed within a specific range from a certain moment. According to the simulation, it can be seen that the resolution of the DOA is also improved as the number i of the virtual antennas increases from 1 to 3N. However, when the number i of the virtual antennas is greater than 3N, the degree of improvement of the DOA resolution is greatly reduced, while the amount of calculation to be processed is greatly increased. Since the number of virtual antennas and the amount of calculation are in a trade-off relationship, it is necessary to appropriately determine the maximum value of the threshold M in consideration of this. From this point of view, the threshold value M may be preferably set in a range from 1 to 3N.

Figure 9:
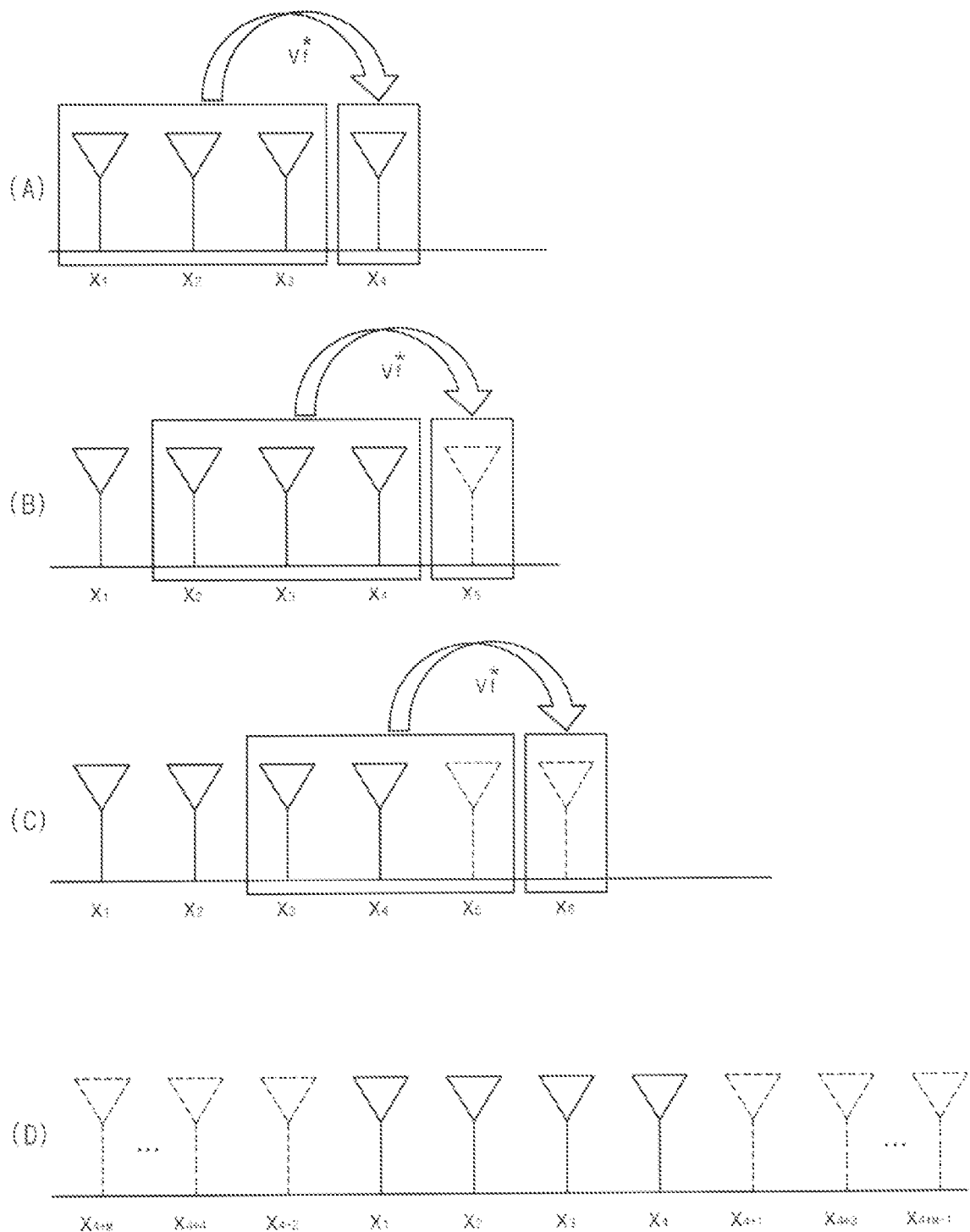
FIG. 9 schematically shows a process of generating virtual reception signals by a method according to an embodiment of the present disclosure in a ULA reception antenna unit including four actual antennas.

FIG. 9 schematically shows a process of generating a virtual reception signal by a method according to an example embodiment of the present disclosure in a ULA reception antenna unit consisting of four actual antennas.

Referring to FIG. 9, a transformation matrix which represents a relationship between the phases of the reception signals $x_1$, $x_2$, and $x_3$ received through three antennas from the first one to the third one and the phase of the reception signal $x_4$ received through the last antenna may be obtained. That is, as shown in (A) of FIG. 9, the phases of the reception signals of antennas #1, #2, and #3 may be multiplied by a weight to obtain a transformation matrix $v^*_f$ that creates the phase of the reception signal through antenna #4. Then, the obtained transformation matrix $v^*_f$ may be multiplied by the phases of the reception signals $x_2$, $x_3$, and $x_4$ received through antennas #2, #3, and #4 to obtain a phase component cps of a reception signal through a virtual antenna #5. In addition, a value obtained by arithmetic-averaging or geometric-averaging the magnitude components of the reception signals $x_1$, $x_2$, $x_3$, and $x_4$ may be obtained as a magnitude component as of a reception signal through a virtual antenna #5. In this way, a fifth reception signal (or a first virtual reception signal) can be generated.

In order to generate the $6^{th}$ reception signal (or the $2^{nd}$ virtual reception signal), as shown in (B) of FIG. 9, the phases of the reception signals $x_2$, $x_3$, and $x_4$ through antennas #2, #3, and #4 are multiplied by weight values to obtain the transformation matrix $v^*_f$ that makes the phase of the reception signal $x_5$ through antenna #5. The obtained transformation matrix $v^*_f$ may be multiplied by the phases of the reception signals $x_3$, $x_4$, and $x_5$ received through antennas #3, #4, and #5 to obtain a phase component $\varphi_6$ of a reception signal through a virtual antenna #6. In addition, a value obtained by arithmetic-averaging or geometric-averaging the magnitude components of the reception signals $x_1$, $x_2$, $x_3$, $x_4$, and $x_5$ may be obtained as the magnitude component $a_6$ of the reception signal of the virtual antenna #6. In this way, the $6^{th}$ reception signal (or the $2^{nd}$ virtual reception signal) may be generated.

Subsequently, as shown in (C) of FIG. 9, the transformation matrix $v^*_f$ may be obtained in the same manner as above using the phases of the reception signals of the antennas #3, #4, and #5 and the phase of the $6^{th}$ reception signal. Using this, a phase component of 7th reception signal (or the $3^{rd}$ virtual reception signal) may be obtained. The magnitude component of the $7^{th}$ reception signal may also be obtained in the same way as above.

In this way, until the number i of virtual reception signals is equal to the predetermined threshold value M, the transformation matrix may be obtained by increasing the value of i by 1, and a new virtual reception signal may be generated repeatedly using the obtained transformation matrix. As shown in (D) of FIG. 9, half of the M virtual antennas may be disposed on the left side of the actual antennas and the other half may be disposed on the right side of the actual antennas. Of course, the numbers of virtual antennas disposed on the left and right sides of the actual antennas may be different from each other. Alternatively, the virtual antennas may be disposed only on the left or right side of the actual antennas.

After performing step S400 to generate M desired virtual reception signals, a DOA estimation algorithm may be performed using reception signals received by N actual antennas and M virtual reception signals generated using those signals as input signals (step S500). In step S500, known algorithms may be used as the DOA estimation algorithm. Representatively, it may be, for example, a known Bartlett algorithm or other known algorithm or a new DOA estimation algorithm that may be developed in the future.

Figure 10:
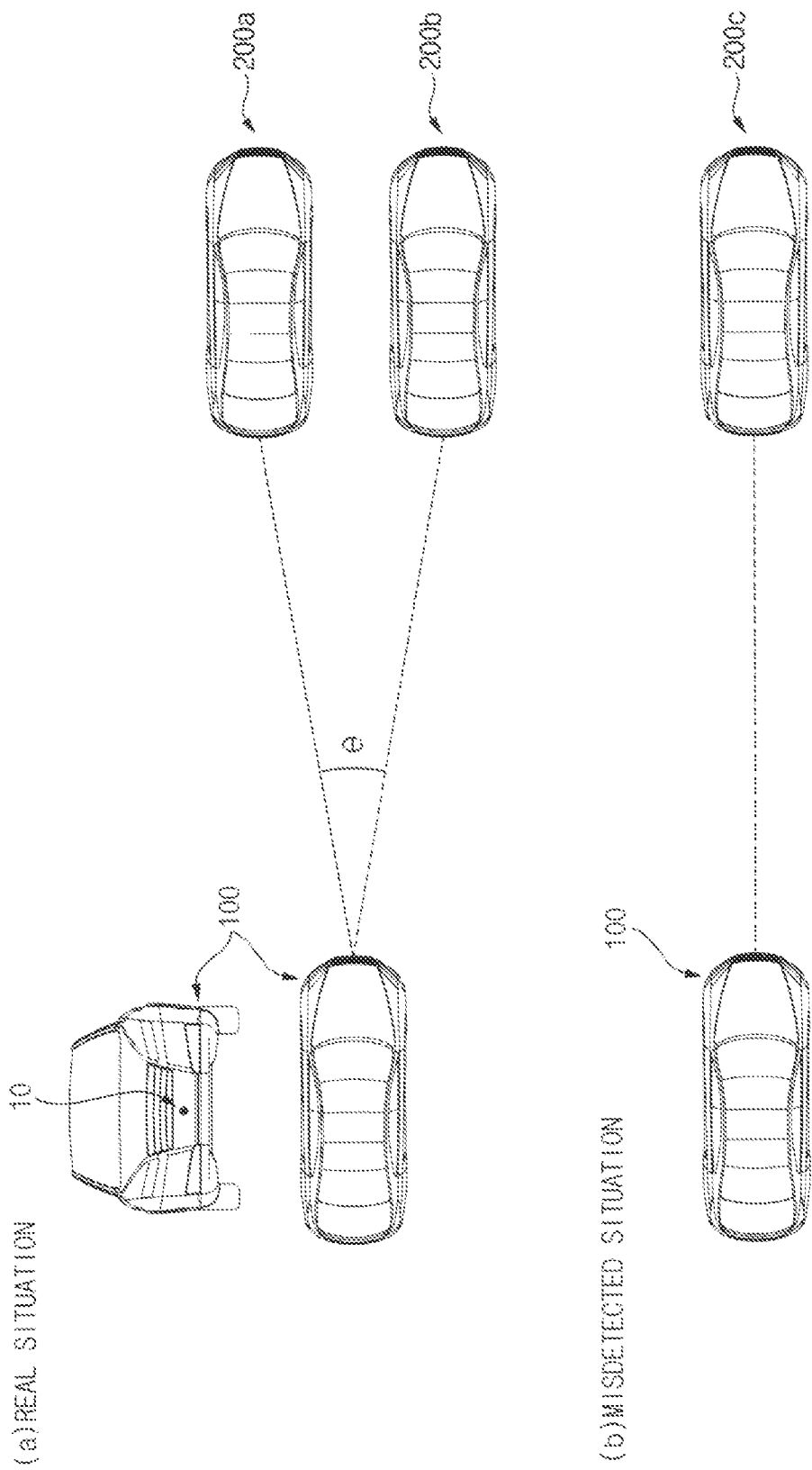
FIG. 10 illustrates a situation in which a vehicle radar system constructed for performing the DOA estimation method according to an embodiment of the present disclosure recognizes two vehicles in front.
Figure 11:
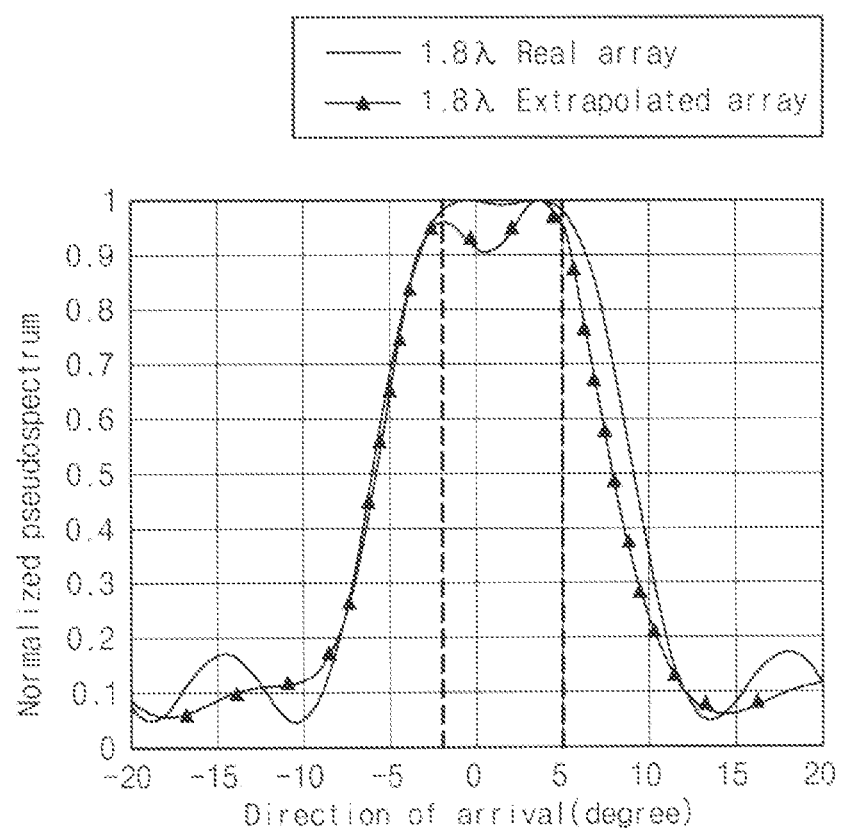
FIG. 11 illustrates Bartlett pseudo-spectra of an actual antenna array and an extended array using the virtual antenna.

The method of estimating the DOA of the reception signal described above can be applied to the radar system 10 for target detection to estimate the DOA of the reception signal with high resolution. FIG. 10 shows a situation in which the radar system 10 is applied to a vehicle 100 to recognize two vehicles 200a and 200b in front. FIG. 11 shows simulation results of DOA estimation for two cases: one is the simulation result of DOA estimation ('Case 1') based on the conventional Bartlett algorithm when only the reception signals received through the actual antennas are used, and the other is the simulation result of DOA estimation ('Case 2') based on the conventional Bartlett algorithm when not only the reception signals received through the actual antennas but also the virtual reception signals received by the extrapolated virtual antennas according to the example embodiment of the present disclosure. In the graph of FIG. 11, the horizontal axis represents the DOA (angle of arrival) of the reception signal, and the vertical axis represents the normalized Bartlett pseudo-spectrum. In the simulation, the ULA receiving antenna unit 60 used for the simulation includes 4 actual antennas. In all simulations, the SNR was set to 10 dB and the antenna interval d was set to 1.8λ. The two black dotted lines indicate the positions of the two targets. In the radar system 10, the angles between the driving direction of the vehicle 100 (the horizontal direction in FIG. 10) and the two target vehicles 200a and 200b existing in front were, for example, −2° and 5°, respectively, and the number of extrapolated virtual antennas M was set to four.

Let's consider that two vehicles 200a and 200b are adjacent to each other at substantially the same distance from the radar system 10. In Case 1, the conventional radar system has poor resolution, so that the radar system 10 cannot distinguish the two target vehicles 200a and 200b in front but does misrecognize them as just one vehicle (refer to FIG. 10(b) and the solid blue graph in FIG. 11). When a ULA antenna unit having a large antenna interval is used, for example, when the antenna interval d is d=2λ, the resolution for classifying the target vehicle may be improved. However, a new problem may arise due to the occurrence of a grating lobe because of the large interval of antennas.

In contrast, in Case 2 according to the example embodiment of the present disclosure, the DOA resolution of the radar system 10 is greatly improved, so that the radar system 10 can recognize the two adjacent vehicles 200a and 200b in front as separate two target vehicles, respectively (refer to FIG. 10(A) and the solid line graph marked with triangles in FIG. 11). Even if the antenna interval is not large (for example, if the antenna interval d=0.8λ), the radar system 10 can provide excellent DOA resolution. For example, in FIG. 11, the estimated angles of two vehicle targets having a 1.8λ extrapolated arrangement are about −2.2°, and 3.7°. The DOA estimation method according to the example embodiment has the advantage of improving the resolution for the target without generating the grating lobe even if the antenna interval d of the ULA antenna unit is set to a value not greater than the wavelength λ of the reception signal of the antennas. The DOA estimation method according to the present disclosure may have a higher angular resolution than the conventional Bartlett algorithm which uses an antenna interval greater than 1.0λ, even if the ULA reception antenna unit 60 used in the present disclosure has the antenna interval less than 1.0λ. There is an advantage of being able to distinguish targets without generating the grating lobe.

The method for estimating the DOA of the reception signals according to example embodiment of the present disclosure described above may be implemented as a computer program executable in a computing device. For example, the computer program may be stored on a computer-readable recording medium. The recording medium may be a nonvolatile recording medium. The computer program may be embedded in and executed by the DSP unit 40.

The radar system 10 described above may be implemented as the hardware component, the software component, and/or combination of the hardware component and the software component. The method according to the example embodiment may be implemented in the form of program instructions that can be executed by various computer means and recorded in the computer-readable medium. The computer-readable medium may include program instructions, data files, data structures, and the like alone or in combination. The program instructions recorded on the medium may be specially designed and configured for the embodiment, or may be known and usable to those skilled in computer software.

The present disclosure can be applied to a radar system to recognize targets in front. For example, it is effective when the present application is applied to the vehicle radar system.

Although the foregoing embodiments have been illustratively described by the limited embodiments and drawings as described above, various modifications and variations can be made from the above description to those of ordinary skill in the art. For example, the described techniques may be performed in a different order than the described method. Even if components such as the described system, structure, device, circuit, etc. are combined in a form different from those described, or are replaced or substituted by other components or equivalents, an appropriate result may be achieved. Therefore, other implementations, other embodiments, and equivalents to the claims also fall within the scope of the following claims.

What is claimed is:

1. A method of estimating a direction of arrival (DOA) of a radar reception signal using antenna array extrapolation, including:

generating a plurality of virtual reception signals, each of the virtual reception signals being generated by: (i) obtaining a transformation matrix which represents a relationship between phases of reception signals received through $i^{th}$ to $(N-2+i)^{th}$ antennas and a phase of a reception signal received through $(N-1+i)^{th}$ antenna in a uniform linear array (ULA) antenna unit in which N antennas are arranged in a row and spaced apart by a distance d, where i is a natural number having an initial value greater than 1 and N is a count of antennas in the ULA, N having a value that is greater than the initial value of i; (ii) generating a phase of a virtual reception signal received through a new $(N+i)^{th}$ virtual antenna by multiplying values corresponding to phases of the reception signals received through $(i+1)^{th}$ to $(N-+i)^{th}$ antennas by the obtained transformation matrix; and (iii) obtaining a magnitude component of the virtual reception signal received through the $(N+i)^{th}$ virtual antenna by averaging magnitudes of the reception signals received through $i^{th}$ to $(N-1+i)^{th}$ antennas, wherein the steps of obtaining the transformation matrix, generating the phase of the virtual reception signal, and obtaining the magnitude component of the virtual reception signal are performed iteratively for each of the plurality of virtual reception signals, while the number i is being increased, until the number i becomes equal to a predetermined threshold value M, the threshold value M being greater than the initial value of i; and using the virtual reception signals to detect a direction of arrival (DOA) of a target.

2. The method of claim 1, wherein the threshold value M is determined based on at least a signal-to-noise ratio and the distance d between the antennas.

3. The method of claim 1, wherein the DOA of the target is detected by executing a predetermined DOA estimation algorithm that is based on the virtual reception signals and the reception signals.

4. The method of claim 3, wherein the predetermined DOA estimation algorithm is a Bartlett algorithm.

5. The method of claim 1, wherein the distance d between the antennas is not greater than a wavelength $\lambda$ of any of the reception signals.

6. The method of claim 1, wherein the transformation matrix is obtained using a linear least square method based on a relationship between the reception signals.

7. The method of claim 1, wherein:
the transformation matrix for a given virtual reception signal is obtained by using a given signal, the given signal being generated by: (i) transforming the reception signals from the time domain into the frequency domain to produce frequency-domain signals; and (ii) transforming one of the frequent domain signals that corresponds to a beat frequency into the time domain to produce the given signal,
the transformation matrix for give virtual reception signal is generated based on the phases of the reception signals received through $i^{th}$ to $(N-2+i)^{th}$ antennas, and
the given virtual reception signal is generated by processing, with the transformation matrix, the values corresponding tot he phase of the reception signals received through $(i+1)^{th}$ to $(N-1+i)^{th}$ antennas.

8. The method of claim 7, wherein the step of 'transforming the received radio signals from the time domain into the frequency domain includes: transforming each of the received radio signals into a respective complex signal form by using a Hilbert transform; transforming each respective complex signal into a different frequency domain signal by performing Fourier transform; and calibrating the corresponding frequency domain signals.

9. The method of claim 7, wherein the one of the frequency domain signals that corresponds to the beat frequency is transformed into the time domain by using an inverse Fourier transform.

10. An apparatus for estimating a DOA of a radar reception signal using antenna array extrapolation, comprising:

a ULA antenna unit including N antennas for receiving a radar signal reflected ad returned after transmitting the radar signal forward, wherein the N antennas are arranged in a row and spaced apart by a distance d;

a passband unit configured to extract an intermediate frequency signal of the radar reception signal received through the ULA antenna unit and converts the extracted intermediate frequency signal of the reception signal into a digital signal; and a data processing unit that is configured to generate a plurality of virtual reception signals, each of the virtual reception signals being generated by: (i) obtaining a transformation matrix which represents a relationship between phases of reception signals received through $i^{th}$ to $(N-2+i)^{th}$ antennas and a phase of reception signal received through $(N-1+i)^{th}$ antenna, by using the reception signal in digital form provided from the passband unit, where i is a natural number having an initial value greater than 1 and N has a value that is greater than the initial value of i: (ii) generating a phase of a virtual reception signal received through a new $(N+i)^{th}$ virtual antenna by multiplying values corresponding to phases of the reception signals received through $(i+1)^{th}$ to $(N-1+i)^{th}$ antennas by the obtained transformation matrix; and (iii) obtaining a magnitude component of the virtual reception signal received through the $(N+i)^{th}$ virtual antenna by averaging magnitudes of the reception signals received through $i^{th}$ to $(N-1+i)^{th}$ antennas, wherein the 'obtaining of the transformation matrix', the 'generating of the phase of the virtual reception signal', and the 'obtaining of the magnitude component of the virtual reception signal' are performed iteratively for each of the plurality of virtual reception signals, while increasing the number i, until the number i becomes equal to a predetermined threshold value M, the threshold value M being greater than the initial value of i.

11. The apparatus of claim 10, wherein the threshold value M is determined based on at least a signal-to-noise ratio and the distance d between the antennas.

12. The apparatus of claim 10, wherein the DOA of the target is detected by executing a predetermined DOA estimation algorithm is based on the virtual reception signals and the reception signals.

13. The apparatus of claim 10, wherein the transformation matrix is obtained using a linear least square method based on a relationship between the reception signals.

14. The apparatus of claim 10, wherein the distance d between the antennas is not greater than a wavelength $\lambda$ of any of the reception signals.

15. The apparatus of claim 10, further comprising a direction of arrival (DOA) estimation unit that is configured to use the virtual reception signals to detect a DOA of a target.

* * * * *